Feb. 24, 1953     L. A. NORVILLE, JR., ET AL     2,629,313
ROTARY ROASTING FORK
Filed April 28, 1950
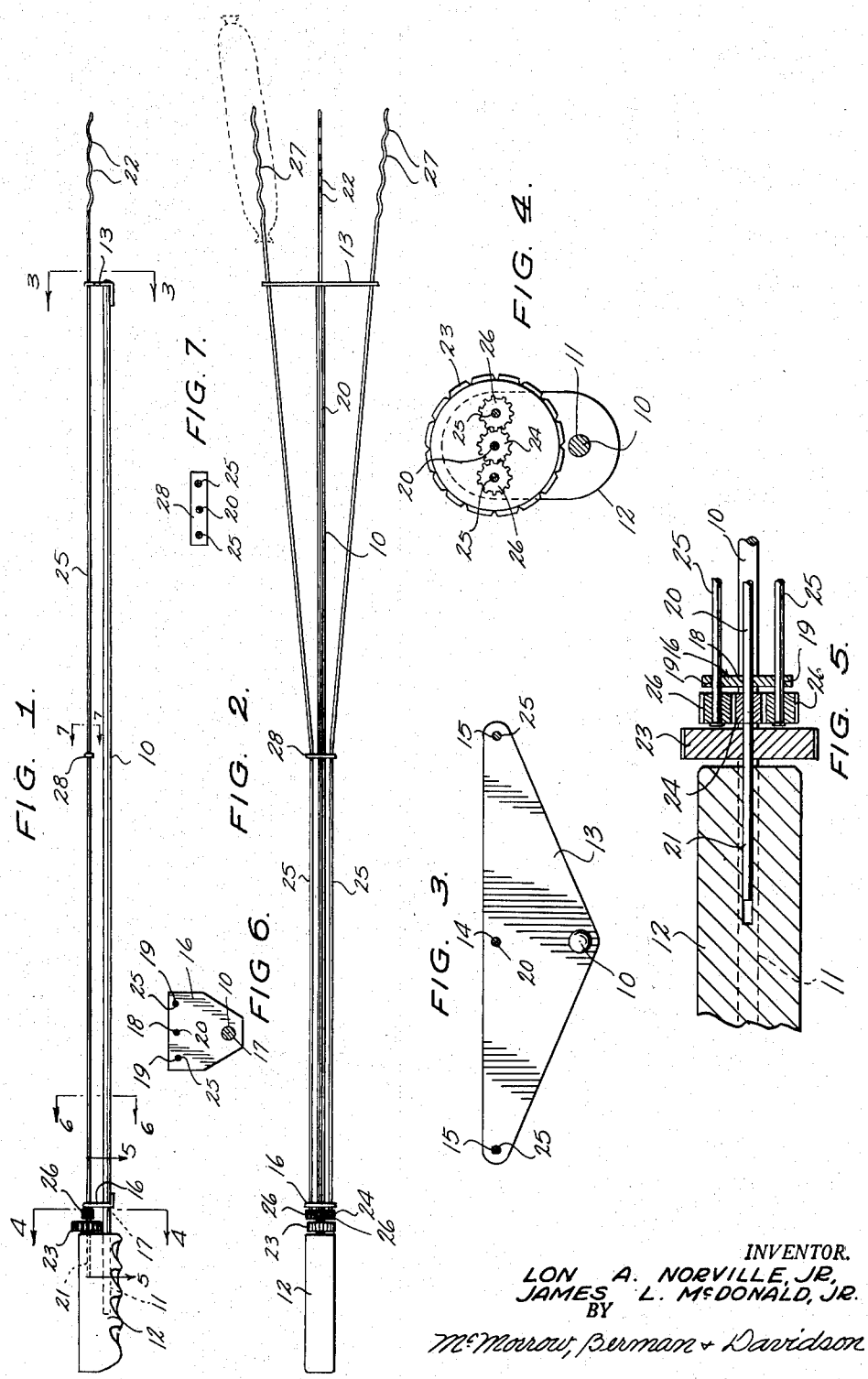
INVENTOR.
LON A. NORVILLE, JR,
JAMES L. McDONALD, JR.
BY
McMorrow, Berman & Davidson
ATTORNEYS.

Patented Feb. 24, 1953

2,629,313

UNITED STATES PATENT OFFICE 2,629,313

ROTARY ROASTING FORK

Lon A. Norville, Jr., and James L. McDonald, Jr., Richmond, Calif.

Application April 28, 1950, Serial No. 158,698

2 Claims. (Cl. 99—421)

Our invention relates to a rotary roasting fork.

A primary object of the invention is to provide a highly simplified, light and sturdy rotary roasting fork which will facilitate roasting wieners, marshmallows and the like evenly on all sides.

A further object is to provide a roasting fork of the above-mentioned character including a plurality of separate rotatable prongs or tines, together with novel and simplified means for turning the tines simultaneously.

A still further object of our invention is to provide a device of the above-mentioned character which is highly compact, sturdy and durable in construction and inexpensive to manufacture.

Other objects and advantages of our invention will be apparent during the course of the following description.

In the accompanying drawings forming a part of this application, and in which like numerals are employed to designate like parts throughout the same:

Figure 1 is a side elevational view of a roasting fork embodying our invention;

Figure 2 is a plan view of the same;

Figure 3 is an enlarged, transverse, vertical sectional view taken on line 3—3 of Figure 1;

Figure 4 is a similar view taken on line 4—4 of Figure 1;

Figure 5 is an enlarged, fragmentary, horizontal sectional view taken on line 5—5 of Figure 1;

Figure 6 is an enlarged, fragmentary, transverse, vertical, sectional view taken on line 6—6 of Figure 1; and Figure 7 is a similar view taken on line 7—7 of Figure 1.

In the drawings, where, for the purpose of illustration is shown a preferred embodiment of our invention, the numeral 10 designates an elongated, straight, substantially rigid support rod having one end securely anchored within a longitudinal opening or bore 11 formed in the forward end of a longitudinal, elongated, generally cylindrical handle 12. As shown in Figure 1, the support rod 10 is arranged near the bottom side of the handle 12, so that the top of the handle projects above the rod 10 for a substantial distance.

A forward, transverse, vertical bearing plate 13 is rigidly secured to the forward end of the support rod 10, as shown, and the plate 13 extends equidistantly laterally beyond opposite sides of the rod 10, as shown. The forward bearing plate 13 likewise projects above the rod 10 for a substantial distance, and is provided adjacent to its top, transverse edge with a center aperture 14 and a pair of outer or side apertures 15 arranged near the opposite extremities of the plate 13 and spaced equidistantly from the center aperture 14 and rod 10 upon opposite sides thereof. A second or rear bearing plate 16 is disposed near and slightly forwardly of the handle 12, and the plate 16 is vertically disposed and provided near its bottom with an opening 17 receiving the support rod 10 therein. The rear bearing plate 16 is rigidly secured to the rod 10 and extends equidistantly laterally beyond the opposite sides of the rod, like the forward bearing plate 13, although the rear plate 16 is somewhat narrower than the forward plate 13, as shown. The rear bearing plate 16 is provided near its top edge with a central aperture 18 and side apertures 19 arranged near the opposite side edges of the plate 16 and spaced equidistantly laterally upon opposite sides of the rod 10 and central aperture 18. The apertures 18 and 19 are disposed at the same elevation above the rod 10 as the apertures 14 and 15 of the forward bearing plate 13, and the central aperture 18 is arranged in axial alignment with the central aperture 14. The outer or side apertures 15, however, are disposed laterally outwardly of the side apertures 19 for substantial distances, Figure 2.

A center, elongated, straight wire prong or tine 20 is journaled within the central apertures 14 and 18 of the forward and rear bearing plates 13 and 16, as shown, and the central tine 20 extends longitudinally rearwardly of the rear bearing plate 16 and has its rear end journaled within a central, longitudinal opening or bore 21 formed in the forward end of the handle 12. The center tine 20 extends longitudinally forwardly of the forward bearing plate 13, and is preferably crimped or fluted near its forward end, as at 22, to facilitate firmly holding wieners, marshmallows and the like. A knurled knob or wheel 23 is fixedly secured to the center tine 20 for rotation therewith and disposed adjacent to the forward end of the handle 12. A small drive gear 24 is securely mounted upon the center tine 20 for rotation therewith and arranged between the knurled knob 23 and rear bearing plate 16.

A pair of elongated, generally straight, rotatable side tines 25 are disposed upon opposite sides of the center tine 20 and spaced laterally therefrom, and the side tines have their rear ends journaled within the side apertures 19 of the rear bearing plate, as shown. A pair of small driven gears 26 are secured to the rear ends of the side tines 25 for rotation therewith, and arranged between the knurled knob 23 and rear bearing plate 16, Figure 5. The gears 24 and 26 are in permanent mesh, as shown, and rotation of the knurled knob 23 will drive gears 24 and 26 for turning the center tine 20 and side tines 25 simultaneously. Near their forward ends, the side tines 25 are journaled within the side apertures 15 of the forward bearing plate 13, and the side tines extend longitudinally forwardly of the plate 13 and are preferably fluted or crimped at their forward ends, as at 27. The forward ends or points of the center and side tines preferably terminate in substantial lateral alignment, Figure 2. Since the apertures 15 are spaced laterally outwardly of the apertures 19, the side tines 25 diverge longitudinally forwardly, Figure 2, all of the tines being somewhat resilient. A longitudinally slidable, adjustable stabilizer plate 28 is provided, and the stabilizer plate 28 has three laterally spaced openings freely rotatably receiving the center and side tines 20 and 25 therein. The stabilizer plate 28 is spaced above the support rod 10, Figure 1, and free from connection with the support rod. The plate 28 is freely shiftable toward and away from the rear bearing plate 16 to vary the angle of divergency between the forward ends of the side tines 25. Also, when the plate 28 is shifted toward the forward end of the roasting fork, it serves to tension the side tines 25 and constitutes a friction brake device for the tines, so that all of the tines may be held against rotation, if desired.

In use, wieners, marshmallows or the like are pierced by the forward, crimped ends of the tines 20 and 25 and supported by the tines for rotation. The slidable plate 28 is positioned so that the tines are freely rotatable within the apertures of the bearing plates 13 and 16, and the knurled knob 23 may be turned by the thumb for imparting rotation to the tines 20 and 25. The wieners or marshmallows are accordingly turned while they are held over the fire and roasted evenly and uniformly on all sides.

The handle 12 may be formed of wood, some suitable plastics material or any other suitable heat insulating material. We prefer to make our roasting fork approximately 38 inches in overall length, although this distance may be varied as desired.

It is to be understood that the form of the invention herewith shown and described is to be taken as a preferred example of the same, and that various changes in shape, size and arrangement of parts may be resorted to without departing from the spirit of the invention or the scope of the subjoined claims.

Having thus described our invention, we claim:

1. In a roasting fork, a relatively rigid support rod having a fixed handle on its rearward end, a rear bearing plate fixed on and projecting laterally of the longitudinal axis of said rod and extending crosswise of the rod, said rear bearing plate being spaced forwardly from said handle, a forward bearing plate fixed on and projecting laterally of the longitudinal axis of said rod on the same side thereof as said rear bearing plate and extending crosswise of the rod, said front bearing plate being wider than said rear bearing plate and having end portions projecting laterally outwardly from the rod and from the ends of the rear bearing plate, said bearing plate being formed with longitudinally aligned center bearing holes, a center tine journalled in said center bearing holes, said center tine having a rear end reaching rearwardly beyond the rear bearing plate and journalled in said handle and a forward end reaching forwardly beyond said front bearing plate, said front bearing plate having side bearing holes displaced laterally outwardly from the center bearing hole thereof, said rear bearing plate having side bearing holes displaced laterally from the center bearing hole thereof, the side bearing holes of the front bearing plate being displaced laterally outwardly from the bearing holes of the rear bearing plate, flexible side tines journalled in the side bearing holes of the front and rear bearing plates whereby the side tines diverge forwardly with respect to the center tine, the side tines having forward ends reaching forwardly beyond the front bearing plate and rearward ends reaching rearwardly beyond said rear bearing plate and journalled in said handle, gears fixed on the side tines between the rear bearing plate and said handle, a gear fixed on the center tine between the rear bearing plate and the handle and meshed with the side tine gears, and a knob fixed on the center tine between the handle and the center tine gear, and a stabilizer plate positioned on the tines between the front and rear bearing plates, said stabilizer plate having a center hole slidably receiving the center tine and side holes slidably receiving the side tines, the side holes of the stabilizer plate being displaced laterally inwardly from the side bearing holes of the front bearing plate whereby forward movement of the stabilizer plate along the center and side tines produces laterally inward deflection of the side tines toward the center tine so as to frictionally bind the tines against free rotation on their axes.

2. In a roasting fork involving a center tine and side tines positioned in the plane of the center tines, means supporting said tines for rotation on their longitudinal axes including means positioning said side tines laterally outwardly of the center tine and diverging from said center tine toward one end of the tines, and means for rotating the tines on their longitudinal axes, the improvement of a stabilizer plate formed with a center hole receiving the center tine and end holes receiving the side tines, the end holes being displaced laterally inwardly toward the center tine at distances from the center tine less than the lateral reach of said stabilizer plate along the tines toward the said one end thereof produces laterally inward displacement of the side tines and binding of the stabilizer plate on the tines resisting rotation of the tines on their longitudinal axes.

LON A. NORVILLE, JR.
JAMES L. McDONALD, JR.

REFERENCES CITED

The following references are of record in the file of this patent:

UNITED STATES PATENTS

| Number | Name | Date |
|---|---|---|
| 99,971 | Taylor et al. | Feb. 15, 1870 |
| 1,869,299 | Bracht | July 26, 1932 |
| 2,004,659 | Groch | June 11, 1935 |
| 2,315,143 | Thompson | Mar. 30, 1943 |
| 2,484,858 | Schmidt | Oct. 18, 1949 |
| 2,517,448 | Schmeling | Aug. 1, 1950 |
| 2,535,548 | Porter | Dec. 26, 1950 |
| 2,558,365 | Lehnus | June 26, 1951 |